Figure 1:
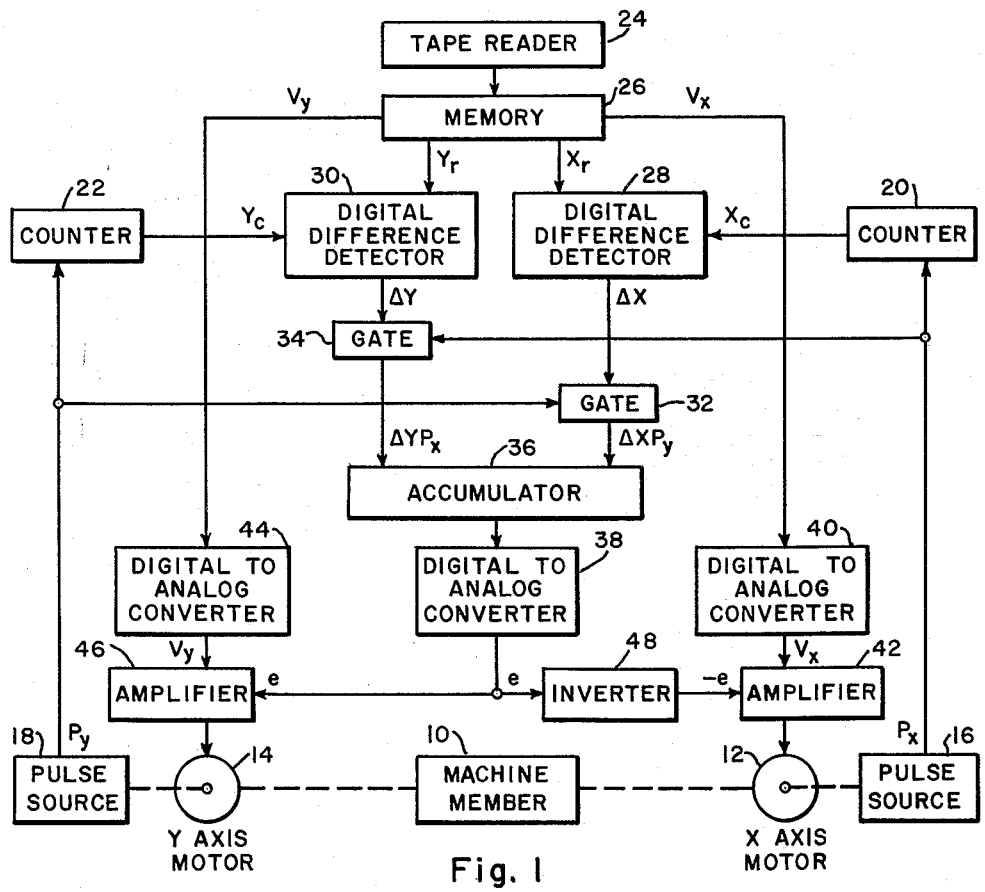

July 30, 1963   L. W. HERCHENROEDER   3,099,781
DIGITAL CONTROL FOR MACHINE POSITIONING
Filed Nov. 15, 1961

WITNESSES

INVENTOR
Louis W. Herchenroeder
BY
ATTORNEY

United States Patent Office 3,099,781
Patented July 30, 1963

3,099,781
DIGITAL CONTROL FOR MACHINE
POSITIONING
Louis W. Herchenroeder, Pittsburgh, Pa., assignor to Westinghouse Electric Corporation, East Pittsburgh, Pa., a corporation of Pennsylvania
Filed Nov. 15, 1961, Ser. No. 152,581
10 Claims. (Cl. 318—162)

This invention relates, in general, to electrical control apparatus, and in particular to electrical control apparatus for a machine member.

In the positioning control of a machine member, for example the contour or other control of a machine tool, it is often desired to have the machine tool follow a particular linear path to perform a machining operation such as, for example, milling or cutting. In control apparatus for performing such functions, input signals, or commands, are provided, usually obtained from a punched tape, to control the incremental movement of the machine member along the desired path. Input signals indicative of a new desired position are often given in incremental units, and if it is desired to move a machine member a certain distance along a linear path it would be necessary to give a large number of such input signals. This abundance of input signals necessitates the use of a greater amount of punched tape, increases the probability of error in the tape reading apparatus, and increases the expense of a fast acting tape reader.

Accordingly, it is one object of the present invention to provide positioning control apparatus for a machine member, which functions with fewer input signals.

It is a further object to provide positioning control apparatus for a machine member, which machine member will follow a desired path in accordance with a single desired position input signal.

A further object is to provide positioning control apparatus for a machine member which apparatus will correct any deviation by the machine member from a desired linear path.

In accordance with the objects of the invention, there is provided a machine member capable of being driven in accordance with a plurality of coordinates by drive motors, one for each coordinate. As the machine member is driven in a desired direction, positioning signals are produced representative of the movement of the machine member. By means of a suitable information interpreter, such as a tape reader, commands are fed into the system indicative of a desired velocity for each coordinate drive motor, and a next desired coordinate position. Each new desired position is compared with the actual coordinate position and a difference signal is obtained for each coordinate which is fed into an accumulator after being gated by the positioning signals produced by movement of the machine member. If the machine member is following the desired path to the next desired position, the output of the accumulator device will be substantially zero, and the desired velocity input signals will drive the respective coordinate motors such that the machine member will reach the new desired position. If, however, the machine member deviates from the desired path, the accumulator will produce an error output signal which is utilized to modify the speeds of the coordinate motors to thereby bring the machine member back to its desired path.

Figure 2:
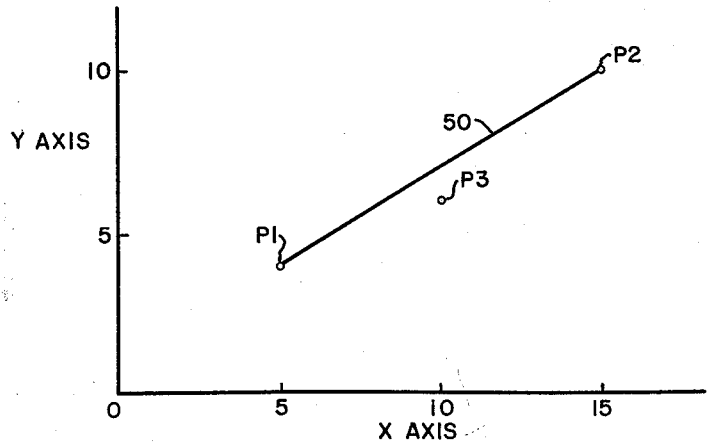

The above-stated, and further objects of the present invention will become apparent upon a reading of the specification and reference to the drawings, in which:

FIGURE 1 shows a control apparatus in accordance with the present invention; and FIG. 2 is a graph illustration showing an actual position of a machine member, a new desired position of that machine member and a desired path along which the machine member is to be moved.

Referring now to FIG. 1, machine member 10 is capable of being driven in a desired direction by an X axis motor 12 and a Y axis motor 14. For simplicity, only two such drive motors are shown, although it is to be understood that the system is capable of operation in a third dimension by adding a suitable third, or Z axis driving means. Since a linear motion in a plane can be resolved into an X coordinate movement and a Y coordinate movement, there is provided means for producing signals proportional to the movement of the machine member in an X direction and in a Y direction, which means may take the form of pulse sources 16 and 18. The pulse source 16 may be arranged to produce a signal, or pulse, every time the machine member 10 moves an incremental distance along the X coordinate. By way of example, the pulse source 16 will produce a pulse for every incremental movement of 1/1000 of an inch by the machine member 10 along the X coordinate. Pulse source 18 likewise produces a pulse for every 1/1000 of an inch movement of the machine member 10 along the Y coordinate.

The pulses produced by the pulse source 16, which are indicative of the movement of the machine member, may be fed into a storage device such as counter 20 in order to provide a signal which is indicative of the actual position of the machine member 10 along the X coordinate. Similarly, the counter 22 is operative with the pulses received from the pulse source 18 to provide a signal which is indicative of the actual position of the machine member 10 along the Y coordinate.

A tape reader 24 is provided which reads prepunched information on an input tape and delivers it to a memory device 26, where the information is stored until it is used by the control apparatus. If the new desired position of the machine member 10 is at a new X coordinate and at a new Y coordinate, the output signals from the memory device 26 may take the form of a desired velocity signal $V_x$ in the X direction, a desired velocity signal $V_y$ in the Y direction, for respectively controlling the X axis motor 12 and the Y axis motor 14. In addition, the output of the memory device may provide a next desired X coordinate signal $X_r$ and a next desired Y coordinate signal $Y_r$.

If it is desired that the machine member 10 follow a path solely along one coordinate, for example along a Y coordinate, the memory device will produce but two new signals, that is, a different desired velocity signal $V_y$ and a different desired coordinate signal $Y_r$ with the desired velocity signal $V_x$ being zero and the desired coordinate signal $X_r$ remaining the same value as for the previous operation.

The actual X position signal $X_c$ from counter 20 and the next desired X position signal $X_r$ from the memory device 26 may be fed into a subtracting device such as digital difference detector 28, for the purpose of obtaining a position difference signal $\Delta X$ which represents the distance the machine member 10 must travel along the X coordinate in order to reach the next desired X coordinate position in accordance with the signal $X_r$. Likewise, the digital difference detector 30 is operable with the actual Y position signal $Y_c$ from counter 22 and with the next desired Y coordinate signal $Y_r$ to produce a Y coordinate position difference signal $\Delta Y$ which represents the distance which the machine member must travel along the Y coordinate to reach its next desired Y position in accordance with the signal $Y_r$.

In order to give a correcting error signal $e$, a storage device such as accumulator 36 is provided. The X coordinate position difference signal $\Delta X$ is fed into the accumulator 36 through gate device 32 which transmits the $\Delta X$ signal each time it is pulsed by a pulse from the source 18. Gate device 34 is similarly operable with the pulses from source 16 to pass the Y coordinate position difference signal ΔY to the accumulator 36 each time the gate 34 is pulsed.

The output signal from the accumulator 36 may if desired be passed through a digital to analog converter 38 to obtain an analog error signal $e$. The desired X velocity signal $V_x$ from the memory device 26 may also be in digital form, and is fed into an operational amplifier device 42 after being converted to an analog signal by the digital to analog converter 40. Similarly, the desired Y velocity signal $V_y$ is fed into an operational amplifier 46 after being converted to an analog signal by the digital to analog converter 44.

Should the machine member 10 deviate from its desired linear path, an error signal $e$ will appear at the output of the digital to analog converter 38, which error signal $e$ is utilized to speed up one of the drive motors and slow down the other drive motor. Since by way of example, only a single error signal $e$ is shown as appearing at the output of the digital to analog converter 38, an inverter 48 or signal complementing device is provided so that one of the motors is speeded up while the other is slowed down. The operational amplifiers 42 and 46 combine the desired velocity signals $V_x$ and $V_y$ with any error signal $e$ to modify the speed of the motors 12 and 14, which in turn corrects any deviation of the machine member 10 from its desired path.

For a clearer understanding of the present control apparatus, reference is now made to FIG. 2 which shows an actual position P1 of the machine member, a desired position P2, and a desired linear path 50 along which the machine member is to move. Each unit distance along each of the X and the Y axis may represent, in an actual system, 1/1000 of an inch movement. The point P1 has an XY coordinate of (5, 4) and the P2 position has an XY coordinate of (15, 10).

The input signals $V_x$ and $V_y$ shown in FIG. 1 are utilized to drive the X axis motor 12 and the Y axis motor 14 to move the machine member 10 along the desired path 50. The position difference signal ΔX obtained from the digital difference detector 28 represents the distance the machine member is to move along the X coordinate to its new desired position, and the position difference signal ΔY obtained from the digital difference detector 30 represents the distance along the Y axis which the machine member 10 is to move to its new desired position. Since ΔY will be fed into the accumulator 36 only when a pulse $P_x$ from pulse source 16 is fed into the gate 34, and since ΔX will be fed into the accumulator 36 only when a pulse $P_y$ from pulse source 18 is fed into the gate 32, the total average signals fed into the accumulator 36 will be as follows:

Initial ΔX = (15−5) = 10    Initial ΔY = (10−4) = 6
Final ΔX = 0               Final ΔY = 0

Average $\Delta X = \frac{10+0}{2} = 5$    Average $\Delta Y = \frac{6+0}{2} = 3$ Average ΔX pulsed by $P_y$ 6 times = $(\overline{\Delta X}) P_y$ = (5)6 = 30

Average ΔY pulsed by $P_x$ 10 times = $(\overline{\Delta Y}) P_x$ = (3)10 = 30

Since the pulsed ΔX signals are equal to the pulsed ΔY signals fed into the accumulator 36, no position error signals $e$ are produced to modify the speed of the motors. If, however, the machine member deviates from its desired path to a point, say P3, the average position difference signals fed into the accumulator 36 will be as follows:

Initial ΔX = 10              Initial ΔY = 6
ΔX at P3 = 5                 ΔY at P3 = 4

Average $\Delta X = \frac{10+5}{2} = 7.5$    Average $\Delta Y = \frac{6+4}{2} = 5$ Average ΔX pulsed by $P_y$ 2 times = $(\overline{\Delta X}) P_y$ = (7.5)2 = 15

Average ΔY pulsed by $P_x$ 5 times = $(\overline{\Delta Y}) P_x$ = (5)5 = 25

It may be seen that the signals fed into the accumulator 36 are unequal and therefore a position error signal $e$ is produced which is fed into the amplifier 46 to speed up the Y axis motor and is also fed through the inverter 48 to the amplifier 42 to modify the control of the X axis motor to slow it down. This causes the machine member 10 to be driven back to its desired path 50. When the machine member 10 reaches its new desired position P2, the velocity signals $V_x$ and $V_y$ are cut off, and the system is ready for a new set of signals indicative of a new next desired position.

Although the present invention has been described with a certain degree of particularity, it should be understood that the present disclosure has been made by way of example and that numerous changes in the details of construction and the combination and arrangement of parts may be resorted to without departing from the scope and spirit of the invention.

I claim as my invention:

1. Apparatus for positioning a machine member in accordance with at least one of a desired rate input signal and a desired position input signal and comprising in combination, first and second signal producing means operative with said machine member for producing a first actual positioning signal and a second actual positioning signal in accordance with the actual positioning of said machine member, a signal difference device operable with said first actual positioning signal and one of said input signals for providing a positioning difference signal, a signal storage device responsive to said positioning difference signal and at least one of said first and second actual positioning signals for providing a positioning error signal, and machine member driving means responsive to one of said input signals and said positioning error signal for driving said machine member in accordance with at least one of said input signals.

2. Apparatus for positioning a machine member in accordance with a desired rate input signal and a desired position input signal, comprising in combination, first and second signal producing means operative with said machine member for producing a first actual position signal and a second actual position signal in accordance with the actual position of said machine member, a signal difference device operatble with said first actual position signal and said desired position input signal for providing a position difference signal, a signal storage device responsive to said position difference signal and at least one of said first and second actual position signals for providing a position error signal, and machine member driving means responsive to said desired rate input signal and said position error signal for driving said machine member in accordance with said input signals.

3. Apparatus for positioning a machine member in accordance with a desired movement control signal and a desired position control signal, comprising in combination, first and second signal producing means operative with said machine member for producing respectively a first actual positioning signal and a second actual positioning signal in accordance with the actual positioning of said machine member, signal counter means for receiving one of said actual positioning signals to provide an actual position signal, a signal comparison device operable with said actual position signal and one of said control signals for providing a position change signal, a signal storage device responsive to said position change signal and one of said first and second actual positioning signals for providing a position error signal, and machine member driving means responsive to the other of said control signals and said position error signal for driving said machine member in accordance with said control signals.

4. Apparatus for positioning a machine member in accordance with at least one of a rate control input signal and a position control input signal, comprising in combination, first and second signal sources operative with said machine member for producing respectively a first positioning signal and a second positioning signal in accordance with the positioning of said machine member, a first signal operation device operable with said first positioning signal and one of said input signals for providing a positioning difference signal, a second signal operation device responsive to said positioning difference signal and at least one of said first and second positioning signals for providing a positioning error signal, and machine member driving means responsive to one of said input signals and said positioning error signal for driving said machine member in accordance with at least one of said input signals.

5. Apparatus for positioning a machine member in accordance with at least one of a desired rate input signal and a desired position input signal, comprising in combination, first and second positional feedback signal producing means operable with said machine member for producing a first positional feedback signal and a second positional feedback signal in accordance with the positional movement of said machine member, a first signal comparison device operable with said first positional feedback signal and a predetermined one of said input signals for providing a positional change signal, a second signal comparison device responsive to said positional change signal and one of said first and second positional feedback signals for providing a positional error signal, and machine member driving means responsive to a predetermined one of said input signals and said positional error signal for driving said machine member in accordance with at least one of said input signals.

6. In control apparatus for controlling the movement of a machine member and operative with at least one desired rate input signal, in combination, first and second positional feedback signal means for producing respectively first and second positional feedback signals in accordance with the actual positioning of said machine member, first and second counter devices operable with said first and second feedback signals for providing respectively first and second positioning difference signals, a signal storage device, first gating means operative with said first positioning difference signal and responsive to said second feedback signal, second gating means operable with said second positional difference signal and responsive to said first feedback signal, said first and second gating means being operable to provide said signal storage device with said first and second positional difference signals for producing a positional error signal, and driving means responsive to said error signal and at least said one desired rate input signal for positioning said machine member.

7. In apparatus for controlling the movement of a machine member and operative with at least two desired position signals, in combination, first and second positional feedback signal means for producing respectively first and second feedback signals in accordance with the positional movement of said machine member, first and second signal counter devices for respectively receiving said first and second feedback signals and operative to produce first and second actual position signals, first and second signal difference devices operable respectively with said first and second actual position signals and operable with one of said desired position signals for providing respectively first and second positioning difference signals, a signal storage device, first gating means operative with said first positioning difference signal and responsive to said second feedback signal, second gating means operable with said second positional difference signal and responsive to said first feedback signal, said first and second gating means being operable to provide said signal storage device with said first and second difference signals for producing a positional error signal, and driving means responsive to said error signal for positioning said machine member.

8. In a control system for controlling the movement of a machine member along two coordinates and operative with a desired rate input signal and a desired coordinate position input signal, in combination, first and second positional feedback signal means for producing first and second feedback signals in accordance with the actual positioning of said machine member, first and second signal operation devices each respectively operable with said first and second feedback signals and said desired coordinate position input signal for providing respectively first coordinate and second coordinate positioning difference signals, a signal storage device, first gating means operative with said first coordinate positioning difference signal and responsive to said second feedback signal, second gating means operable with said second coordinate positional difference signal and responsive to said first feedback signal, said first and second gating means being operable to provide said signal storage device with difference signals for producing a positional error signal, and driving means responsive to said error signal and said desired rate input signals for positioning said machine member along said coordinates.

9. In apparatus for controlling the movement of a machine member and operative with at least a desired rate input signal and a desired position input signal, in combination, first and second positional feedback signal means for producing first and second feedback signals in accordance with the actual positioning of said machine member, first and second signal difference devices operable with at least said feedback signals for providing respectively first and second positioning difference signals, a signal storage device operable to receive said difference signals for producing a positional error signal, and driving means responsive to said error signal and said desired rate input signal for positioning said machine member.

10. In apparatus for controlling the movement of a machine member and operative with first and second desired rate input signals and with first and second desired position signals, the combination comprising, first and second positional feedback means for respectively producing first and second feedback signals in accordance with the actual positioning of said machine member, first and second signal comparison devices each being operable with a respective one of said feedback signals and each being operable with a respective one of said desired position signals for producing respectively first and second positioning difference signals, a signal storage device, first gating means operative with said first positioning difference signal and responsive to said second feedback signal, second gating means operable with said second positioning difference signal and responsive to said first feedback signal, said first and second gating means being operable to provide said signal storage device with difference signals for producing a positional error signal, a first machine member drive motor and first amplifier device for controlling said motor, a second machine member drive motor and second amplifier device for controlling said second motor, with said first amplifier device being responsive to said positional error signal and said first desired rate input signal, and with said second amplifier device being responsive to said positional error signal and said second desired rate input signal, whereby said machine member is positioned in accordance with said input signals.

References Cited in the file of this patent

UNITED STATES PATENTS 2,922,940   Mergler _____ Jan. 26, 1960